United States Patent
Williams

(10) Patent No.: US 11,512,805 B2
(45) Date of Patent: Nov. 29, 2022

(54) CLEANING ASSEMBLY FOR A TUBULAR DRAG CONVEYOR

(71) Applicant: Intraco, Inc., Oskaloosa, IA (US)

(72) Inventor: Millard Manley Williams, Oskaloosa, IA (US)

(73) Assignee: Intraco, Inc., Oskaloosa, IA (US)

( * ) Notice: Subject to any disclaimer, the term of this patent is extended or adjusted under 35 U.S.C. 154(b) by 296 days.

(21) Appl. No.: 16/850,694

(22) Filed: Apr. 16, 2020

(65) Prior Publication Data
US 2021/0324992 A1 Oct. 21, 2021

(51) Int. Cl.
| | |
|---|---|
| *B08B 9/043* | (2006.01) |
| *F16L 55/30* | (2006.01) |
| *F16L 55/44* | (2006.01) |
| *B65G 19/22* | (2006.01) |
| *B65G 19/14* | (2006.01) |
| *B08B 9/053* | (2006.01) |
| *F16L 101/12* | (2006.01) |

(52) U.S. Cl.
CPC ............ *F16L 55/44* (2013.01); *B08B 9/0436* (2013.01); *B08B 9/0535* (2013.01); *B65G 19/14* (2013.01); *B65G 19/22* (2013.01); *F16L 55/30* (2013.01); *F16L 2101/12* (2013.01)

(58) Field of Classification Search
CPC . F16L 55/30; F16L 55/32; F16L 55/44; F16L 2101/12; B65G 19/22; B08B 9/0436; B08B 9/0535
See application file for complete search history.

(56) References Cited

U.S. PATENT DOCUMENTS

| | | | |
|---|---|---|---|
| 3,216,553 | A | 11/1965 | Leach |
| 5,865,296 | A | 2/1999 | Angus |
| 6,790,399 | B2 | 9/2004 | Fujii |
| 7,267,218 | B1 | 9/2007 | Van Zee et al. |
| 8,863,940 | B2 | 10/2014 | Sterner et al. |
| 9,132,965 | B1 | 9/2015 | Nicholson |
| 9,493,309 | B2 | 11/2016 | Kamps et al. |

(Continued)

FOREIGN PATENT DOCUMENTS

| | | |
|---|---|---|
| DE | 20 2019 000 152 U1 * | 2/2019 |
| EP | 1094019 B1 | 3/2004 |

(Continued)

OTHER PUBLICATIONS

Flexicon Corporation, "Flexi-Disc Tubular Cable Conveyor", www.youtube.com/watch?v=IZUYdaX1i3I&featur=outu.be&t=200, accessed Mar. 3, 2020.

*Primary Examiner* — Randall E Chin
(74) *Attorney, Agent, or Firm* — McDonnell Boehnen Hulbert & Berghoff LLP

(57) ABSTRACT

A cleaning pig assembly is provided for use on a tubular drag conveyor. The assembly is quickly and easily mounted anywhere along the cable, chain, or rope via slots in the assembly components. The components include a puck, a plate, a drag disc, and a cleaning member or tool sandwiched between the puck and the plate. The drag disc provides interference fit on the cable, chain, or rope holding the assembly on the cable, chain, or rope and prevents sliding of the assembly along the cable, chain, or rope during use. The cleaning assembly is installed without the use of tools or clamps. Multiple interchangeable cleaning members are provided depending on cleaning needs.

11 Claims, 7 Drawing Sheets

(56) References Cited

U.S. PATENT DOCUMENTS

| | | | |
|---|---|---|---|
| 9,745,135 B1 | 8/2017 | Nicholson | |
| 9,828,703 B2 | 11/2017 | Witting | |
| 10,329,095 B1 | 6/2019 | Williams | |
| 10,479,608 B2 | 11/2019 | Jagan et al. | |
| 2018/0164673 A1 | 6/2018 | Speed et al. | |
| 2019/0107357 A1* | 4/2019 | McDonald | B08B 9/00 |
| 2020/0062509 A1 | 2/2020 | Barry et al. | |
| 2021/0039144 A1* | 2/2021 | Boyd | F16L 55/26 |

FOREIGN PATENT DOCUMENTS

| | | |
|---|---|---|
| KR | 102007008053 A | 8/2007 |
| KR | 101826182 B1 | 2/2018 |
| WO | 2005035404 A1 | 4/2005 |

\* cited by examiner

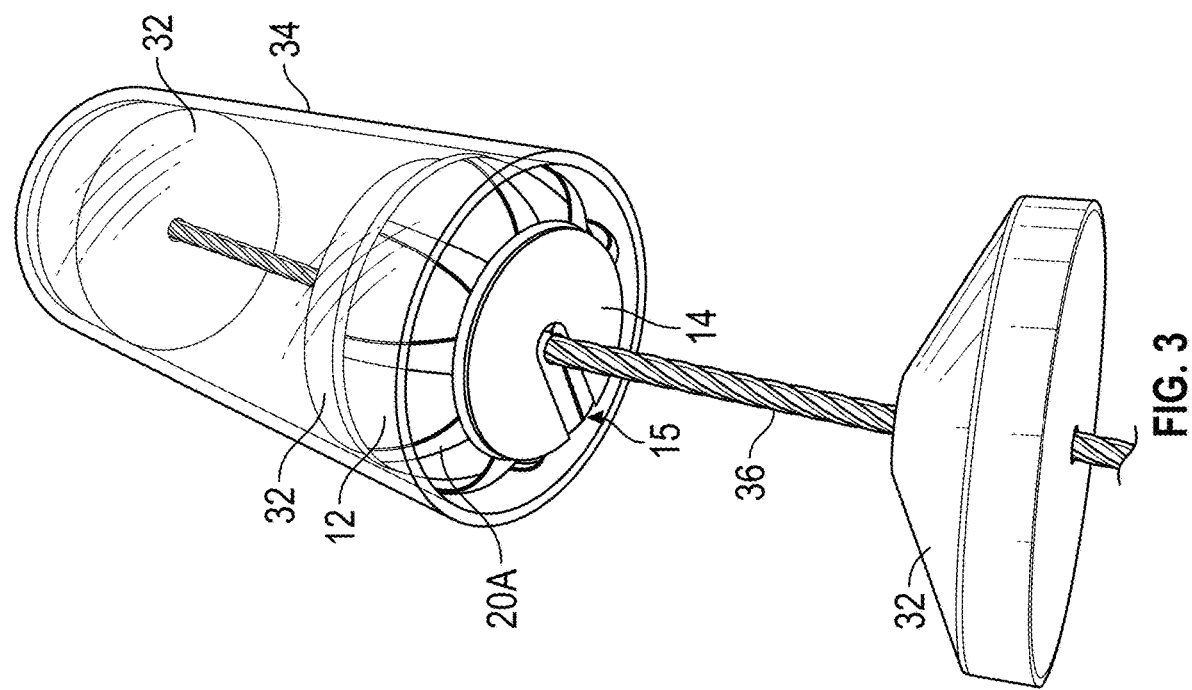
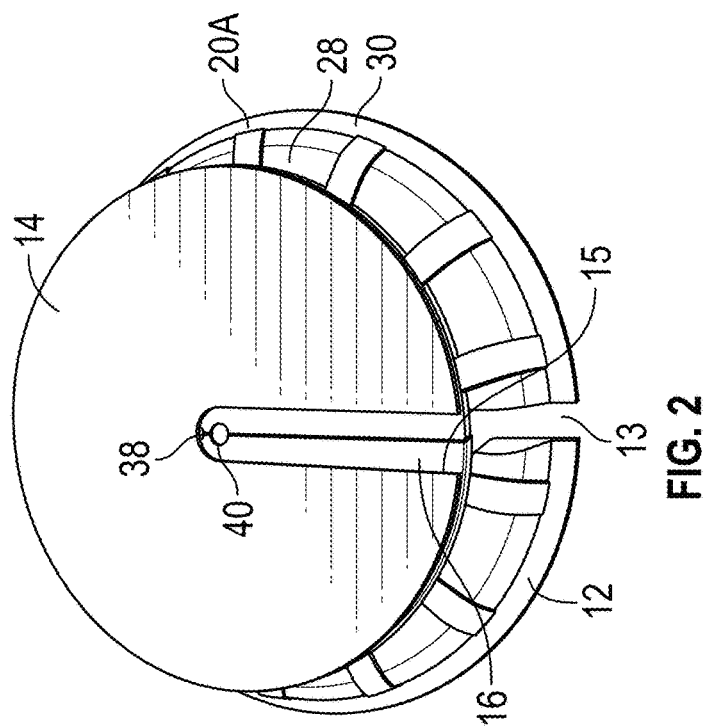

CLEANING ASSEMBLY FOR A TUBULAR DRAG CONVEYOR

FIELD OF THE INVENTION

The invention is directed toward a cleaning assembly used to clean the interior of a drag conveyor tube, with various interchangeable cleaning members, depending upon the type of material to be cleaned from the interior wall of the tube.

BACKGROUND OF THE INVENTION

Tubular drag conveyors, such as a cable conveyor, are typically used to convey particulate material, including granular and powdery substances. For example, see U.S. Pat. Nos. 9,132,965, 9,745,135, 7,267,218 and 10,329,095. These conventional drag conveyors include a tube having a constant diameter with an endless loop cable, chain or rope running through the tube to carry the material from a tube inlet to a tube outlet. Discs are spaced along the cable to carry the material through the tube. The discs have a diameter slightly less than the inside diameter of the tube. A motorized drive sprocket has a plurality of teeth to engage the discs or chain so as to pull the cable, chain or rope through the tube. During use, the inside tube wall tends to become coated with the film or powder from the particulate material, which must be cleaned for food safety and/or to preclude cross-contamination from different materials conveyed through the tube.

In conventional tubular drag conveyor cleaning systems, a "pig" is placed on the cable, chain or rope for pulling through the tube to clean the inside of the tube. In some systems, the ends of the cable, chain or rope have to be disconnected to slide a cleaning pig into place. Other cleaning pigs are bolted to one of the product discs or are clamped to the cable, chain or rope. These prior art cleaning systems are time consuming to install and remove and can damage the disc, cable, chain or rope.

Therefore, there is a need for an improved cleaning assembly for tubular drag conveyors which can be quickly and easily mounted on the cable, chain, or rope without risk of damage to the conveyor components.

Accordingly, the primary objective of the present invention is a provision of an improved cleaning assembly for a tubular drag conveyor utilizing a cable, chain or rope to move material through a tube.

Another objective of the present invention is the provision of a tube conveyor cleaning assembly which utilizes interchangeable cleaning members, depending upon the material to be cleaned from the interior surface of the conveyor tube.

A further objective of the present invention is the provision of a tube conveyor cleaning assembly which quickly and easily slides onto the cable, chain, or rope without the use of tools.

Yet another objective of the present invention is the provision of a cleaning assembly for a tubular drag conveyor which can be mounted anywhere along the cable, chain or rope.

Still another objective of the present invention is the provision of a cleaning assembly for a tubular drag conveyor which can be mounted to the cable, chain, or rope without disconnecting the cable ends.

Another objective of the present invention is the provision of a cleaning pig assembly for a tubular drag conveyor which maintains contact with the inner tube all along the full length of the tube, regardless of the tube path.

Another objective of the present invention is the provision of a tubular drag conveyor cleaning pig which avoids binding in the tube.

A further objective of the present invention is the provision of the tubular drag conveyor cleaning system which is economical to manufacture and efficient and effective in use.

These and other objectives of the invention will become apparent from the following description.

SUMMARY OF THE INVENTION

The cleaning assembly for use in a tubular drag conveyor includes a puck, a plate detachably mounted to the puck, and a cleaning member sandwiched between the puck and the plate. The puck, the plate, and the cleaning member each have a slot extending radially from the perimeter edge to the center to slide the assembled components over the cable, chain, or rope anywhere along the length, adjacent to one of the conveyor discs. Various cleaning members can be selectively used, including a scraper, a sponge, a wiper, or a brush, depending upon the material being cleaned from the interior tube surface. The puck includes a perimeter flange having an outer diameter in close proximity to the tube wall, and a reduced-diameter curved surface, which allows the cleaning member to conform to and matingly engage with the interior surface of the tube. Once the puck, plate and cleaning member are assembled, the assembly can be quickly and easily mounted on the cable, chain or rope without the use of tools. The assembly includes a rubber friction disc to preclude sliding of the assembly along the cable, chain, or rope when the cable, chain, or rope is inclined or vertically oriented.

BRIEF DESCRIPTION OF THE DRAWINGS

FIG. 2 is a perspective view of the assembled cleaning tool shown in FIG. 1.

FIG. 3 shows the assembly of FIG. 2 inside a cable conveyor tube.

DETAILED DESCRIPTION OF THE INVENTION

Figure 1:
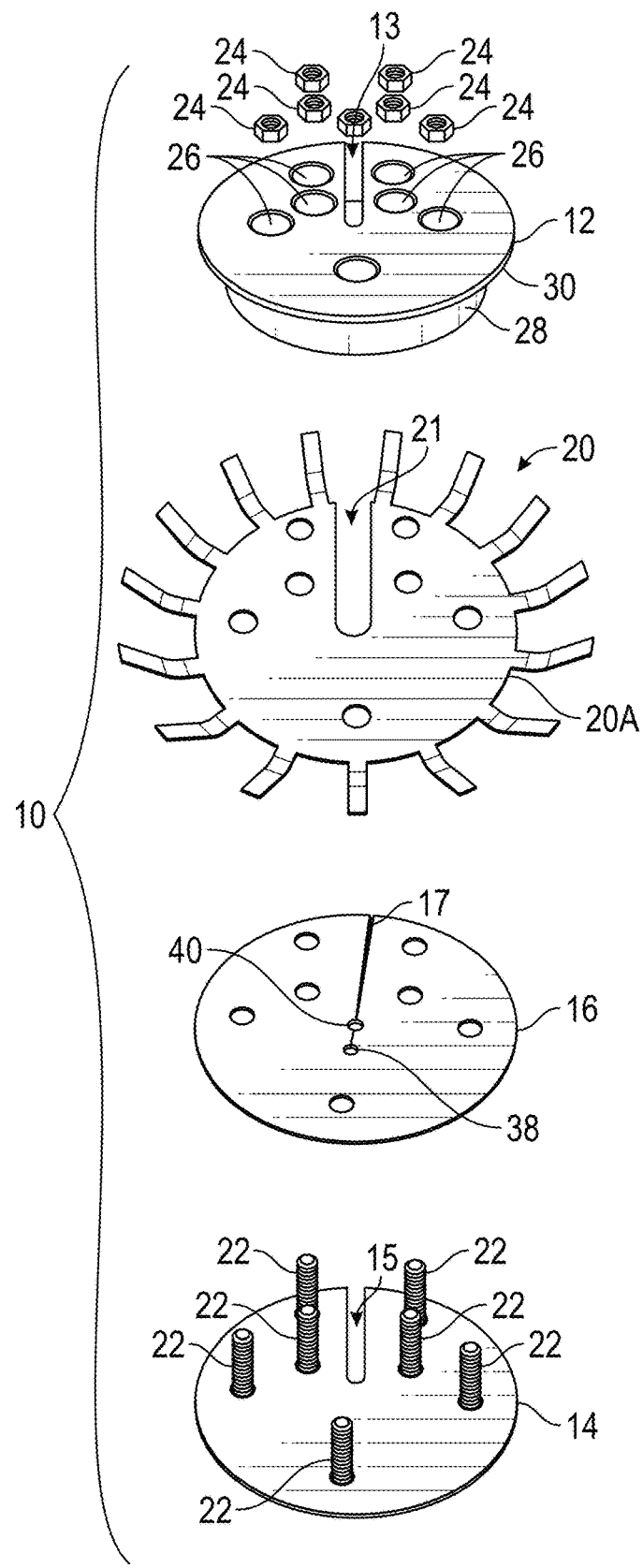
FIG. 1 is an exploded view of one embodiment of the cleaning assembly of the present invention, utilizing a scraper.

The cleaning assembly or pig of the present invention is generally designated by the reference numeral 10 in the drawings. The assembly 10 includes a puck 12, a plate 14, a drag disc 16, and a cleaning tool or member 20. The cleaning member 20 is sandwiched between the puck 12 and the plate 14. The drag disc 16 is located between the plate 14 and the cleaning tool 20. The plate 14 includes a plurality of threaded stub shafts 22 which extend through holes in the drag disc 16, cleaning member 20, and the puck 12, and receive nuts 24 such as nylon locking nuts on the rear of the puck 12. In the preferred embodiment, the puck 12 has rear recesses 26 for receiving the nuts 24. The nylon nuts 24 prevent the puck 12 and plate 14 from loosening, for example from vibration during usage.

Figure 7B:
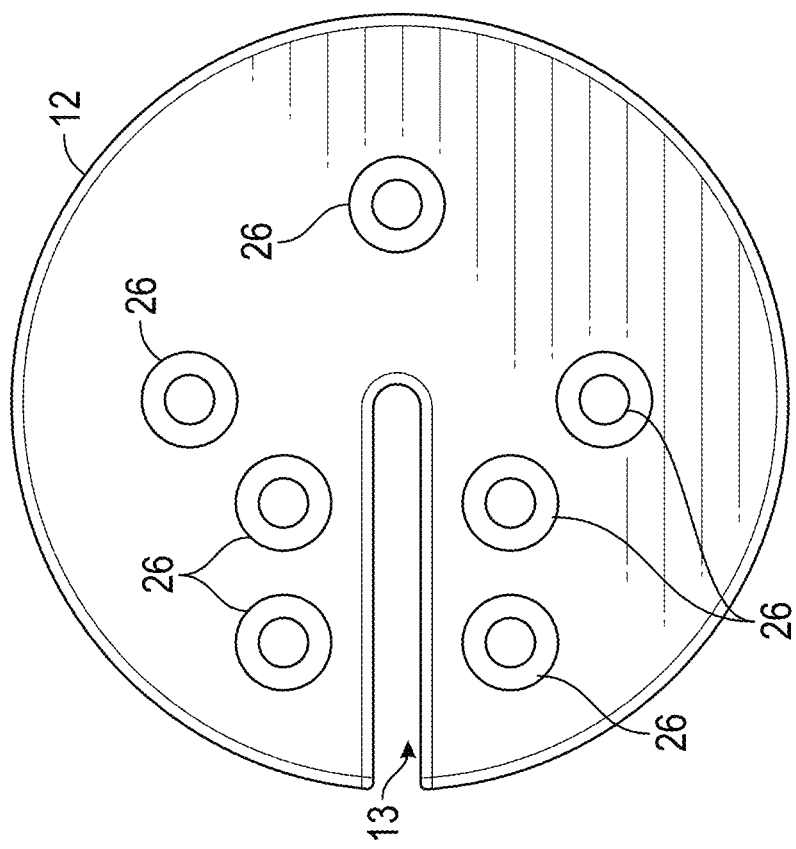
FIG. 7B is a rear elevation view of the puck shown in FIG. 7A.
Figure 7A:
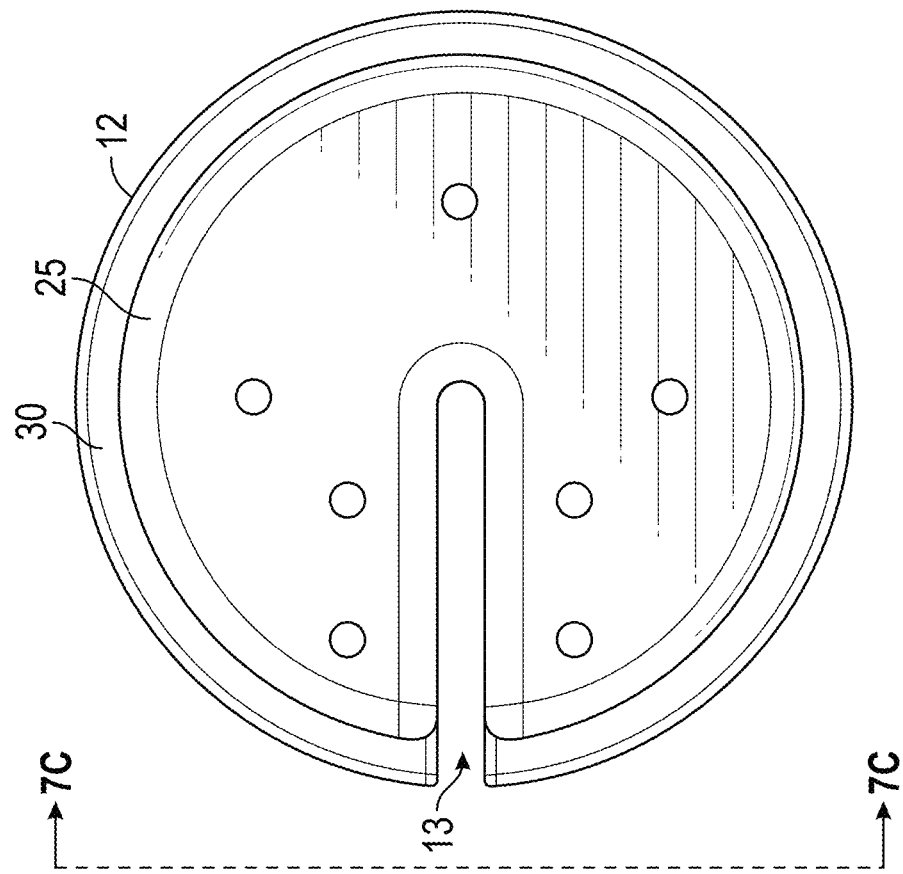
FIG. 7A is a front elevation view of the puck of the cleaning assembly.
Figure 7C:
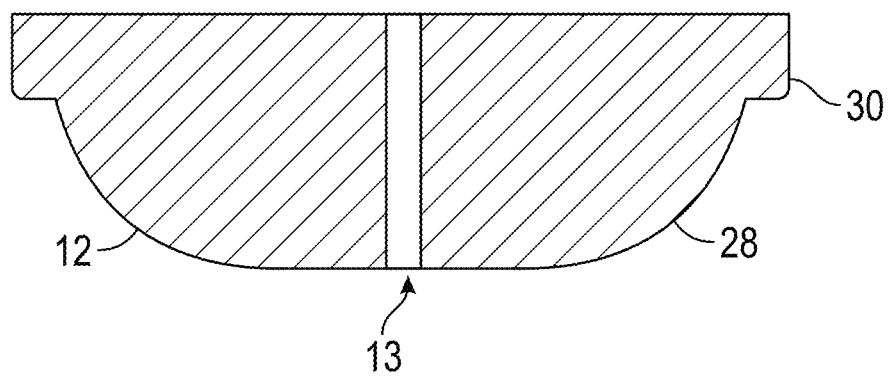
FIG. 7C is a side elevation view of the puck.

The puck 12 includes a body 28 and a perimeter flange 30. Preferably, the diameter of the flange 30 matches the diameter of the conveyor disc 32, so as to be in close tolerance with the interior wall of the tube 34. The body 28 has a curved surface with a reduced diameter forward end, compared to the flange 30, as seen in FIG. 7C. The flange 30 maintains the assembly 10 centered within the tube 34 for optimum cleaning during use. The cable disks 32 wear over time. A disc with a reduced outside diameter will not properly hold and maintain the cleanout pig 10 in the correct position for optimum tube and sweep cleaning. The flange 30 of the puck 12 overcomes such problem with worn discs and helps keep the cleanout components 20A-20D from pinching between the disc and the tube inside diameter, from wearing prematurely, or otherwise being damaged during use.

The drag disc 16 preferably is made of urethane or other flexible material. The drag disc 16 provides a friction fit with the cable 36 so as to prevent sliding of the cleaning assembly 10 along the cable, such as when the tube 34 and cable 36 are in a vertical or inclined orientation.

Figure 4:
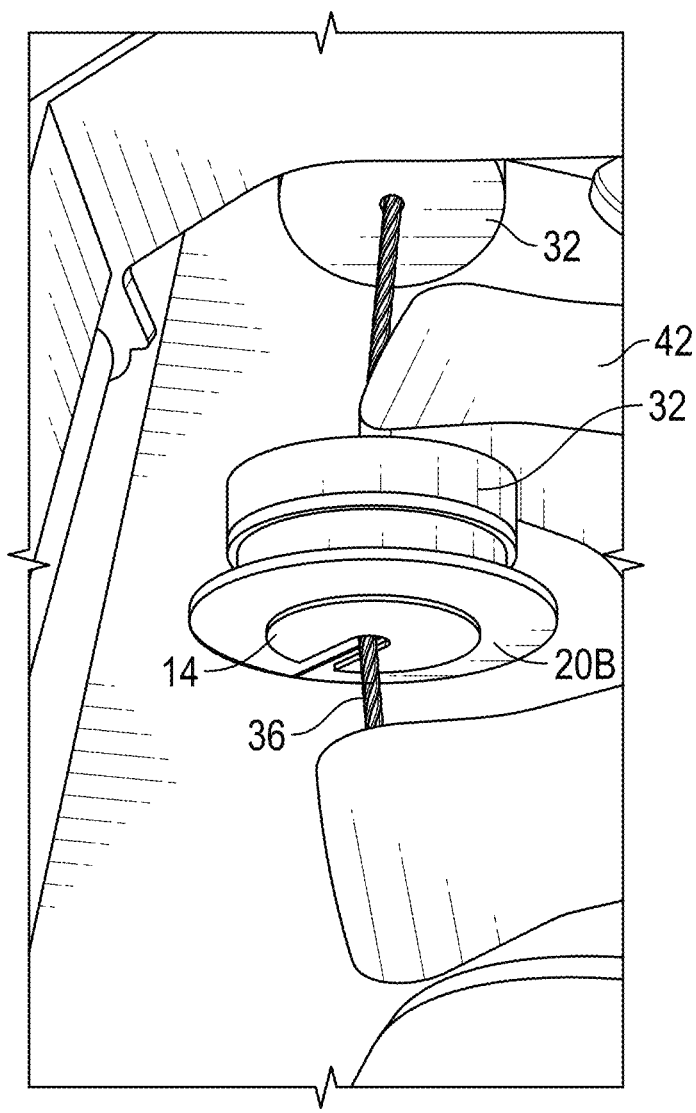
FIG. 4 is a perspective view of a second embodiment of this cleaning assembly utilizing a wiper and positioned between teeth of the cable conveyor drive sprocket.
Figure 5:
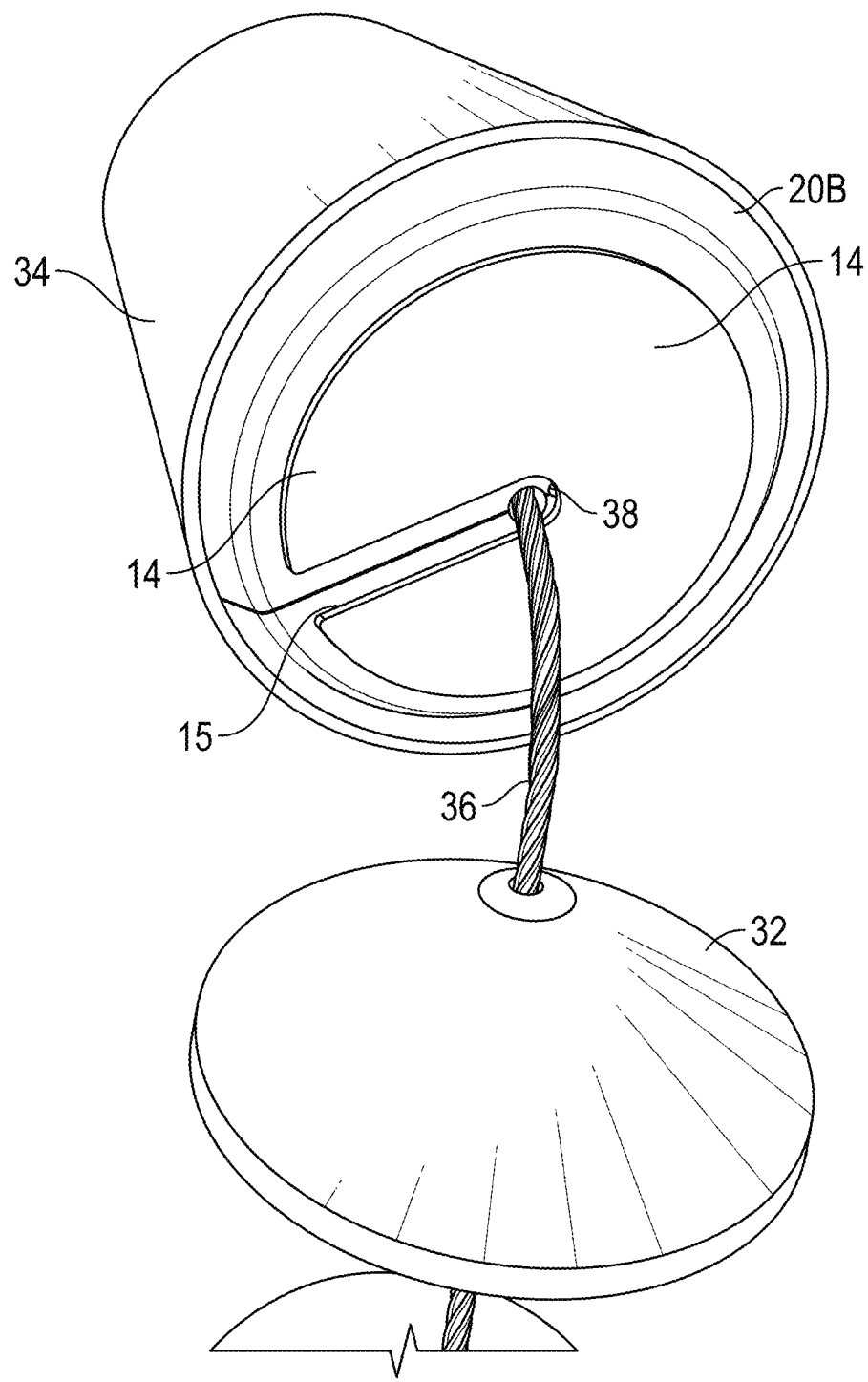
FIG. 5 is a perspective view showing the wiper embodiment of the cleaning assembly in position inside a drag conveyor tube.
Figure 6:
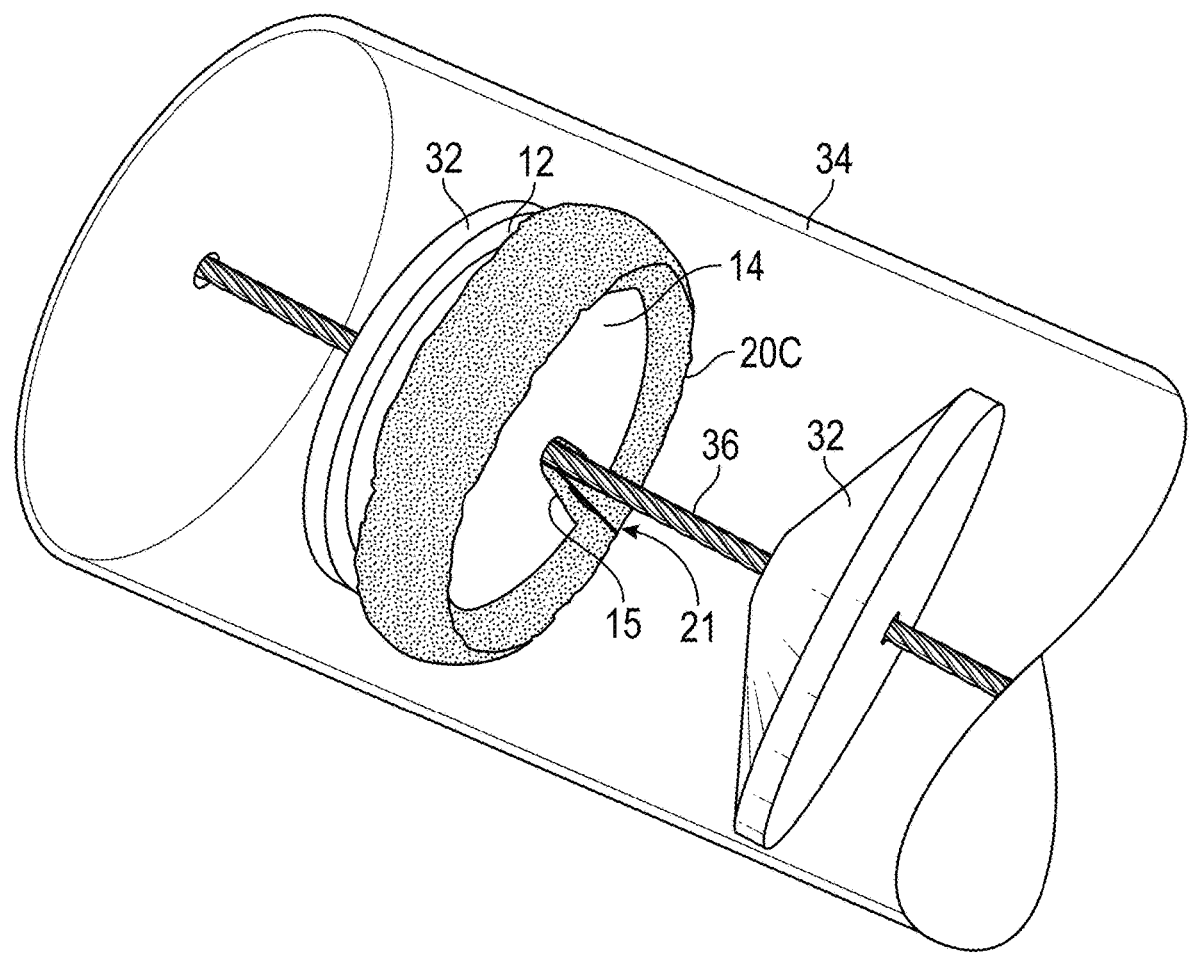
FIG. 6 is a perspective view of a third embodiment of the cleaning assembly, utilizing a sponge.
Figure 8:
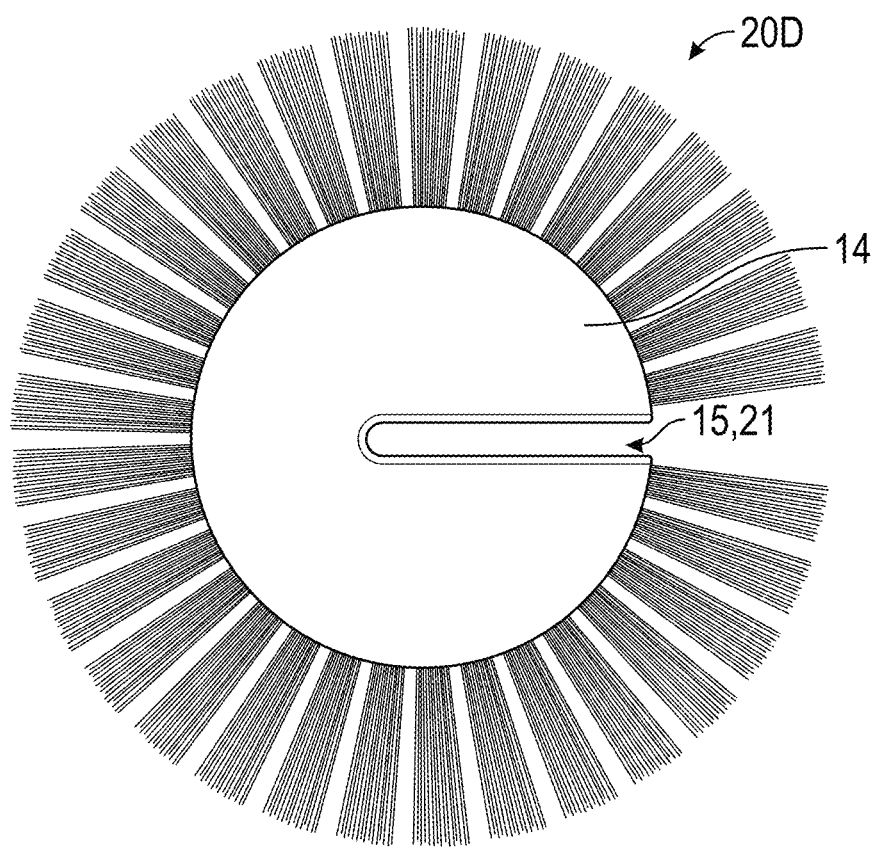
FIG. 8 is a perspective view of a fourth embodiment cleaning brush for the assembly.

The cleaning member or tool 20 can take various forms, depending on cleaning requirements and the material being removed from the interior wall of the tube 34. For example, the member 20 may be a scraper 20A as shown in FIGS. 1-3, a wiper 20B as shown in FIGS. 4 and 5, a sponge 20C as shown in FIG. 6, or a brush 20D as shown in FIG. 8. As seen in FIGS. 7A and 7B, the puck 12 includes a slot 13. As seen in FIG. 1, the plate 14 has a slot 15. The drag disc 16 has a slot 17, as also seen in FIG. 1. The cleaning members 20A, 20B, 20C and 20D each have a slot 21. The slots 13, 15, 17, and 21 extend from the perimeter edge to the center of the respective component. The slots of the puck 12, the plate 14, and the cleaning member 20 have a width slightly larger than the diameter of the cable. The slot 17 of the drag disc 16 is narrower than the cable diameter, and may be a cut or slice through the material of the drag disc. The drag disc 16 has a pair of holes 38, 40 having different diameters allowing for use on cables having different diameters. The slit between the large hole 40 and small hole 38 allows cables to center in the hole 40 by letting the rubber flex tight around the cable O.D.

Each of the cleaning tools 20A, 20B, 20C and 20D has an open or unfolded diameter greater than the diameter of the perimeter flange 30 of the puck 12. When the assembly 10 is moved inside the tube 34, cleaning tool 20A, 20 B, 20C and 20D folds or molds adjacent to the curved body 28 of the puck 12, to maintain contact between the cleaning member and the inside tube wall, shown in FIGS. 3, 5 and 6.

In use, the pig assembly 10 can be mounted at any place or location on the cable 36 adjacent the sprocket 42 (FIG. 4), at a drive unit or a turnaround unit. The slots 13, 15, 17, and 21, allow the pig assembly to be mounted on the cable without the use of tools. The assembly 10 can be positioned anywhere along the cable 36 so as to reside against the leading side of one of the conveyor discs 32, which pushes and supports the assembly 10 as the cable 36 is pulled through the tube so as to clean the tube wall. The assembly or pig 10 is installed and removed from the cable by pulling the pig at an angle relative to the cable 36. As the cable passes between the edges of the slot 17 in the drag disc 16 the rubber edges flex to allow the assembly to slide onto and off of the cable. Thus, the assembly 10 is a clip-on unit which can be mounted and removed without the use of tools anywhere along the cable in front of any disc.

Since the assembly 10 is only used for cleaning, there is little, if any, wear to the perimeter flange 30 of the puck 12. Therefore, the outside diameter of the puck flange 30 establishes and maintains the position of the assembly 10 within the tube 34 for optimum cleaning, scraping, and/or wiping.

The friction fit of the drag disc 16 on the cable 36 also maintains the assembly 10 next to one of the cable discs 32, so as to remain in proper position and avoid interference with the teeth of the sprocket 42.

The cleaning members 20A-D may take various forms (shapes and materials) without departing from the scope of the present convention. FIG. 1 shows the scraper 20A formed as a single piece cut from thin stainless-steel spring material with multiple fingers extending radially outwardly. The fingers cantilever to scrape the inside of the tube. The triangular fingers maintain constant contact with the tube inside diameter as the assembly passes through straight and curved tube sections. The fingers remove buildup of product or material attached to the inside diameter of the tube.

The wiper 20B may be made of rubber or other suitable material and removes dry product and liquid from the tube inside diameter with a squeegee action due to the tight fit of the rubber wiper against the inside tube wall. Dry product debris and liquid pools are removed from horizontal tube sweeps and the void on a lower vertical tube sweep.

The sponge 20C removes dust and light product debris from the inside diameter of the tube and may be used with water and/or detergent. The sponge 20C may also be used as a follow-up to a tube wash and rinse operation. The sponge 20C may also be used with a sanitizer solution. The sponge is compressed between the puck 12 and the plate 14 through the sponge centerline so as to form a doughnut shape with an outer radius to facilitate entry of the sponge into the open end of the tube without shearing or tearing of the sponge.

The brush 20D is used to remove dust and light dry product debris from the tube inside diameter. The brush bristles may be made of any appropriate material, such as nylon, to form a circular perimeter with bristles that slide against the tube wall as the cable passes through straight and curved tube sections. The bristles are flexible, so as to have a minimal increase in the system pull load for the cable and drive system.

It is understood that while the drawings show a cable 36 of a tubular drag conveyor, the conveyor can also use a chain, rope of other pulling member for moving the discs through the tube, and that the cleaning assembly 10 can be used in any of these tubular drag conveyors by mounting on the cable, chain, rope or other pulling member. Thus, "pulling member" is used collectively to refer to a cable, chain, rope, or similar structure.

Also, the drawings show the puck and the plate secured with nuts on threaded shafts, which could also be bolts extending through the plate and the puck. As another alternative, the puck and the plate can be connected by other means, such as a twist lock connection, a well nut fastener on a shaft, a press or friction fit, or other quick and easy methods.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A cleaning assembly for a tubular drag conveyor having a tube with an inner wall surface and a pulling member with spaced discs moveable through the pulling member, the assembly comprising:
   a puck having a slot for mounting on the pulling member adjacent to one of the discs;
   a plate detachably mounted to the puck and having a slot for receiving the pulling member;
   a cleaning member sandwiched between the puck and the plate and having a slot for receiving the pulling member; and
   the cleaning member having a diameter greater than an inside diameter of the tube so as to contact the inner wall surface of the tube as the pulling member moves through the tube.

2. The cleaning assembly of claim 1 wherein the assembly is free from a clamp.

3. The cleaning assembly of claim 1 wherein the assembly is mounted and retained on the pulling member without the use of tools.

4. The cleaning assembly of claim 1 wherein the cleaning member is a scraper, a sponge, a wiper or a brush.

5. The cleaning assembly of claim 1 wherein the cleaning member has a resilient perimeter edge.

6. The cleaning assembly of claim 1 wherein the cleaning member has a deformable perimeter edge.

7. The cleaning assembly of claim 1 wherein the plate is secured to the puck with threaded shafts and nuts.

8. The cleaning assembly of claim 1 wherein the puck has a first perimeter edge with a diameter in close proximity to the inside wall surface of the tube and a second perimeter edge with a smaller diameter.

9. The cleaning assembly of claim 8 wherein the puck has a curved perimeter surface between the first and second perimeter edges.

10. The cleaning assembly of claim 1 wherein the plate has threaded stubs extending through the cleaning member and through the puck for receipt of nuts.

11. The cleaning assembly of claim 1 further comprising a drag disc between the plate and the cleaning tool to hold the cleaning assembly in place on the pulling member.

* * * * *